Dec. 23, 1958 J. S. MURRAY 2,866,007

ANSWERING SERVICE ARRANGEMENTS IN TELEPHONE SYSTEMS

Filed May 18, 1954 6 Sheets-Sheet 1

INVENTOR.
JAMES S. MURRAY

BY Wm. Walter Owen

ATTY.

Dec. 23, 1958 J. S. MURRAY 2,866,007

ANSWERING SERVICE ARRANGEMENTS IN TELEPHONE SYSTEMS

Filed May 18, 1954 6 Sheets-Sheet 2

ROTARY FINDER

INVENTOR.
JAMES S. MURRAY

BY Wm. Walter Cwrew

ATTY.

ANSWERING SERVICE ARRANGEMENTS IN TELEPHONE SYSTEMS

Filed May 18, 1954

6 Sheets-Sheet 3

INVENTOR.
JAMES S. MURRAY

BY Wm Walter Owen.

ATTY.

ROTARY IDENTIFIER

TWO-MOTION IDENTIFIER

INVENTOR.
JAMES S. MURRAY
BY [signature]
ATTY.

ANSWERING SERVICE ARRANGEMENTS IN TELEPHONE SYSTEMS

Filed May 18, 1954

LINE EQUIPMENT

TIMER

INVENTOR.
JAMES S. MURRAY
BY Mc Walter Owen
ATTY

Dec. 23, 1958 J. S. MURRAY 2,866,007
ANSWERING SERVICE ARRANGEMENTS IN TELEPHONE SYSTEMS
Filed May 18, 1954 6 Sheets-Sheet 6
FIG. 7 ROTARY IDENTIFIER
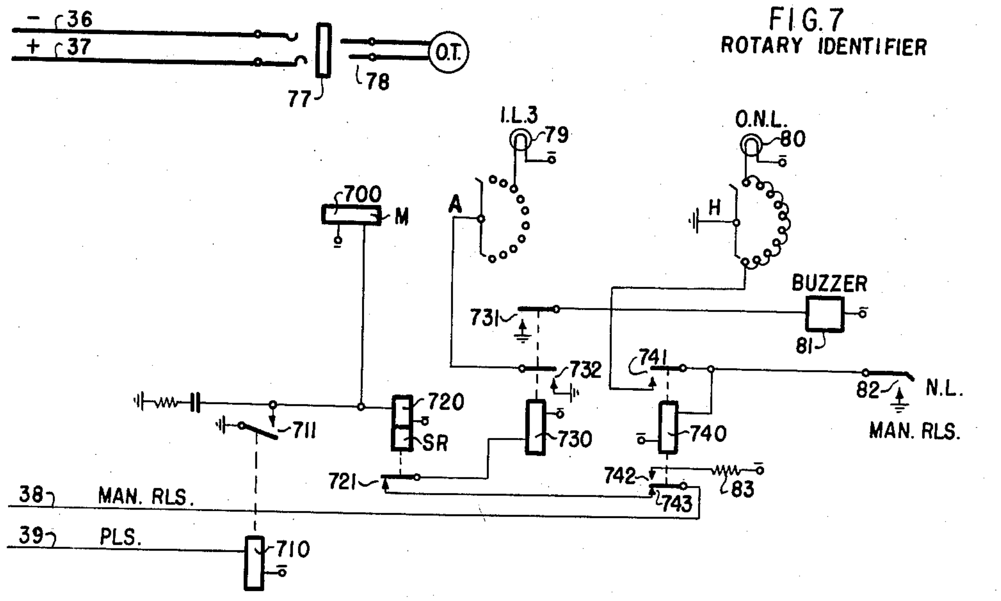
FIG. 8 TWO-MOTION IDENTIFIER
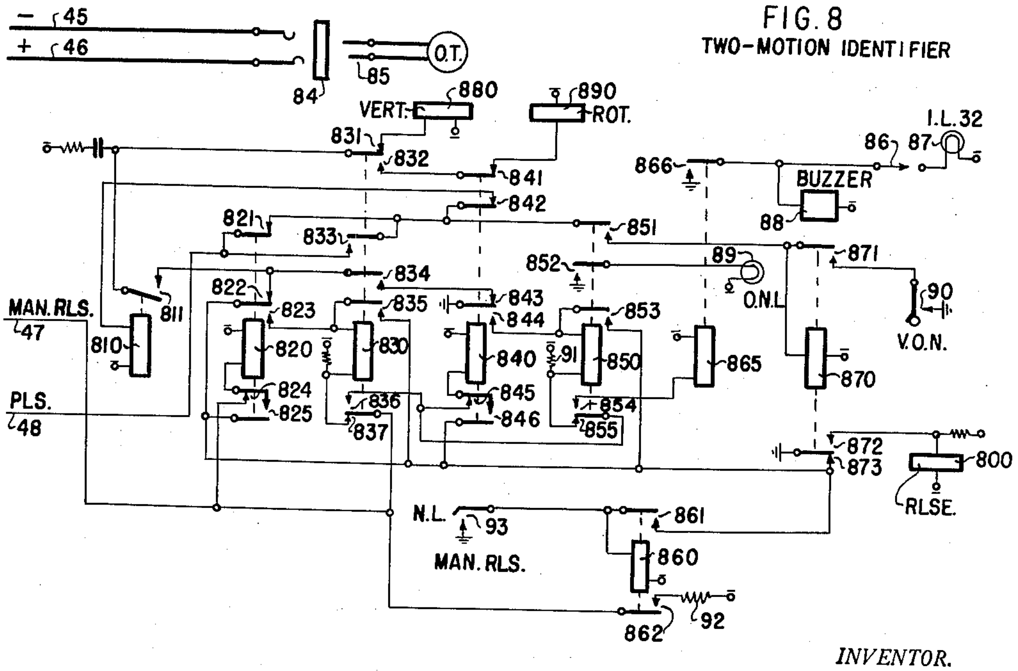
INVENTOR.
JAMES S. MURRAY
BY
ATTY.

United States Patent Office 2,866,007

Patented Dec. 23, 1958

2,866,007

ANSWERING SERVICE ARRANGEMENTS IN TELEPHONE SYSTEMS

James S. Murray, Tampa, Fla., assignor to General Telephone Laboratories, Incorporated, a corporation of Delaware Application May 18, 1954, Serial No. 430,693

12 Claims. (Cl. 179—27)

The invention relates to arrangements in telephone systems by means of which certain subscribers may be provided with answering service, and more particularly secretarial answering service.

Such answering service may be contracted for by a subscriber if he wishes incoming telephone calls to be answered while he is away from his substation, for example, in the case of a physician, while he is absent from his office on calls. For this purpose it is customary to provide as many answering lines or trunks as there are subscribers entitled to this service and jumper each of these trunks at one end to the central office termination of the subscriber's line in question and connect it at the other end to an associated jack or similar answering equipment, for instance, at an answering operator's position in the office of a secretarial answering agency. From the identity of the trunk over which she receives a given call the secretarial operator is thus advised of the identity of the substation to which the call was directed. She may, therefore, answer the intercepted call with a reference to the number or name of the called subscriber and may then supply the calling party with suitable information in accordance with prior instructions given to her by the called subscriber.

While these customary arrangements are generally satisfactory in operation the outlay in cable plant inherent in these systems is considerable, particularly where the answering office is situated in the business center of a given town as is usually the case, while a number of the subscribers privileged to this type of service are connected to relatively outlying exchanges.

It is accordingly an object of the invention to provide a novel and improved arrangement wherein the trunking facilities to the location of the answering operator are common to a plurality of privileged subscribers.

It is another object of the invention to provide novel and improved means, especially in an answering arrangement employing such common trunking facilities, whereby the privileged subscriber before leaving his telephone may himself condition his line in a simple manner for answering service and upon his return remove this condition. Such prior conditioning of the subscriber's line for each period of the subscriber's absence is particularly desirable in answering systems using common answering trunks as in that case the loading of the common trunking facilities with unnecessary traffic is avoided. Furthermore, if the conditioning means are placed under the control of the subscriber himself, the latter is assured of privacy in the use of his line while he is in his premises.

Another object of the invention resides in the provision of novel and improved means for supplying the secretarial operator over a common answering trunk with an indication of the identity of the subscriber's line called.

It is yet another object of the invention to provide means for enabling the secretarial operator in certain instances to release the common answering trunk without first placing this trunk into answering condition.

According to one feature of the invention as illustrated in the first embodiment disclosed hereinbelow each substation entitled to answering service is provided with a key and in the central office with a special line equipment for answering service which is interposed, by means of jumpers, between the subscriber's line and the regular termination of his line in the central office; and this special line equipment contains a conditioning relay which when operated under the control of the aforementioned key causes calls thereafter incoming to this line to be extended over a common answering trunk. More particularly, upon receipt of an incoming call a start relay also included in the special line equipment operates and locks, thereby preventing the start relays of all other special line equipments from operating and causing a rotary finder switch associated with the answering trunk to search for the called line. A rotary identifier switch at the distant or operator's end of this trunk is stepped in unison with this finder switch to select a calling lamp individual to this particular line and thereby advise the answering operator of the identity of the called line. In a modified version of this first embodiment in which the two switches are of the two-motion type, a distinct synchronizing pulse is transmitted between the two impulse series for keeping the two switches from falling out of step.

Assuming that only one answering trunk is provided the aforementioned start relay also causes all the remaining key conditioned lines of answering-service-privileged subscribers to be busied in the connector banks so that calling parties trying to reach any of these subscribers are induced to repeat their call at a later time. When a privileged subscriber upon returning to his telephone restores his key, his line is generally restored to conventional operation on incoming as well as outgoing calls. However, should this subscriber thereafter lift his receiver while a call directed to his line, answered or unanswered over the above-mentioned trunk, is still in existence the special line equipment acts to automatically connect this subscriber onto this incoming call.

According to another feature of the invention which is incorporated in the second embodiment disclosed hereafter, each of the privileged subscribers is provided with a special line equipment of simple design, this line equipment containing a ring-up relay and a start relay. The ring-up relay is intermittently operated on incoming calls in response to ringing current projected from the connector to cause the operation and locking of the start relay and also cause upon receipt of each splash of ringing current a corresponding pulse to be transmitted over the answering trunk which causes the selected calling or identifying lamp at the other end to be correspondingly flashed. Since the ring-up relay will cease operating when the incoming call is prematurely abandoned by the calling party or answered by the called subscriber himself, the operator is thus advised of this occurrence. A special release key provided at the operator's position enables her to immediately release the answering trunk under this condition without first connecting her telephone to and then disconnect it from the trunk. This too, enhances the privacy of the system and also reduces the holding time of the answering trunk on this type of calls. It will further be understood that the arrangement according to this second embodiment makes it possible to extend answering service facilities to any given subscriber of a party line, for example, by using tuned relays of the traffic-ringer type as ring-up relays in the case of party-line subscribers.

The invention both as to its organization and method of operation together with other objects and features thereof, will best be understood by reference to the following specification taken in connection with the accompanying drawings. In these drawings:

Figs. 1–5 and 9 illustrate the first embodiment of the invention, the finder and identifier switches shown in Figs. 2 and 4 being of the single-motion type and those shown in Figs. 3 and 5 of the two-motion type; and Figs. 6 and 7 or 8 when used in connection with Figs. 2 and 9 or Figs. 3 and 9, depending on whether single-motion or two-motion switches are to be employed, illustrate the second embodiment.

More particularly:

Fig. 7 is the circuit diagram of the answering apparatus at the distant end of the answering trunk for use in the second embodiment, said apparatus including an identifier switch of the rotary stepping type which cooperates with the rotary finder, Fig. 2;

Fig. 8 is the circuit diagram of the answering apparatus at the distant end of the answering trunk for alternative use in the second embodiment, said apparatus including a Strowger type switch which cooperates with the Strowger finder, Fig. 3;

Figure 10:
Fig. 10 illustrates how the figures involved in the first embodiment when using rotary switches, should be placed with respect to each other to show a unified answering arrangement.
Figure 11:
Figure 12:
Figure 13:

Fig. 11 similarly illustrates how the figures involved in the modification of the first embodiment employing Strowger switches should be placed relatively to each other;

Fig. 12 is a block diagram similar to that of Fig. 10 except relating to the second embodiment when using rotary switches;

Fig. 13 again is a similar block diagram except relating to the modification of the second embodiment in which Strowger switches are employed.

Figure 1:
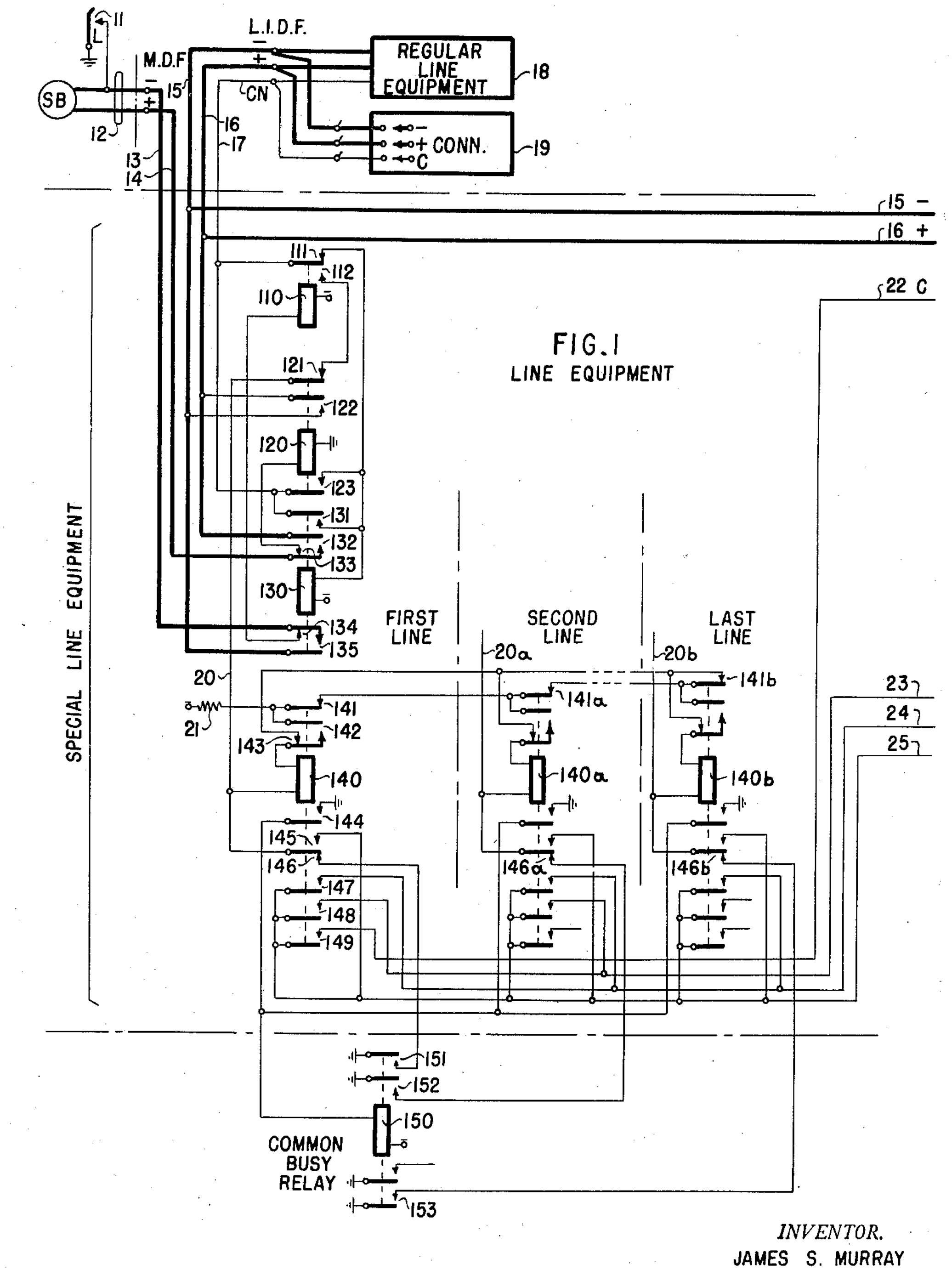
Fig. 1 is the circuit diagram of the special line equipment for answering service as used in the first embodiment, the associated substation, subscriber's line and regular line equipment as well as a connector also being schematically indicated in this figure.
Figure 6:
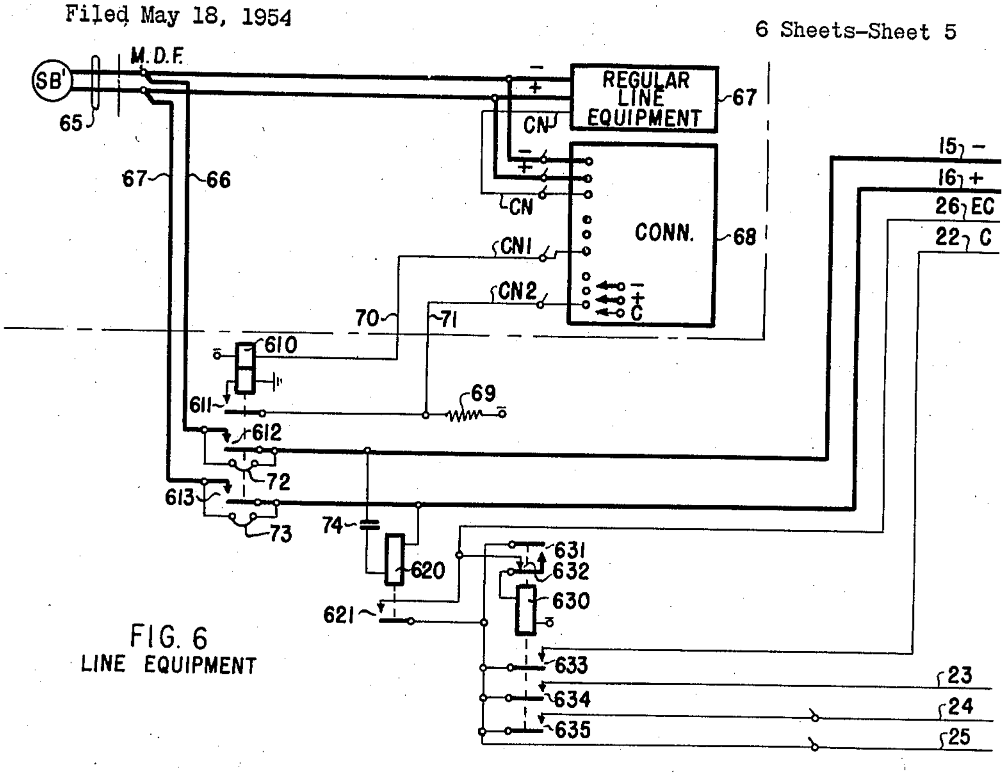
Fig. 6 is the circuit diagram of the special line equipment for answering service as used in the second embodiment of the invention, the associated substation and subscriber's line and part of its regular termination as well as a connector also being schematically shown in this figure.

The apparatus components such as relays and switches used in both embodiments are individually of conventional design and are believed to require no further explanation. The regular line equipment and the common switching equipment of the central office to which the privileged subscribers involved in the present answering arrangement are connected and of which a part is schematically indicated in Figs. 1 and 6 may be of any conventional type, reference being made, for example, to Gardner Patent 1,681,034. In order to simplify the description this central office has been shown interconnected, in both embodiments, with the secretarial answering operator's position by only one common answering trunk which has been assumed to be of the 4-wire type. It should be understood, however, that this trunk could comprise a different number of conductors and that a plurality of common answering trunks could also be employed. It will further be understood that the answering trunk shown may extend from the above-mentioned central office to the answering operator's position by way of one or more intermediate telephone offices, depending on the location of this position in relation to the first-mentioned office.

*First embodiment*

Referring now more particularly to Fig. 1 of the drawings, there is shown a substation SB entitled to answering service which is connected by way of subscribers line 12 to the central office and is provided with a locking type key 11 for use in conditioning this substation for secretarial answering at the will of the subscriber. Associated with this subscriber's line in the central office there is a regular line equipment or line circuit 18 which may be of any known type and may, for example, include a line switch similar to line switch C of the above-mentioned Gardner Patent 1,681,034. The remaining switching equipment of the central office is not shown, with the exception of connector 19 which is schematically indicated in Fig. 1 by its wiper set and the set of contacts corresponding to subscriber's line 12. This connector may, for example, be similar to connector H of the above Gardner patent.

There is further shown in Fig. 1, a relay group comprising relays 110 to 140. As indicated by relays **140*a* and 140*b* other such relay groups or line equipments similar to 110—140 may be provided, each interposed by means of jumpers between a given subscriber's line entitled to answering service and the regular line termination of this line in the central office. For example, the special line equipment 110—140 shown in full in Fig. 1, is connected by means of jumpers 13, 14 to the subscriber's line, 12, itself and by means of jumpers 15, 16 and 17 to the negative, positive and CN conductor respectively of the regular line termination of this line in the central office. In Fig. 1 it has been assumed that the central office includes both a main distributing frame MDF and a line intermediate distributing frame LIDF and that special line equipment 110 to 140 is interposed by means of the aforementioned jumpers between these two frames. Busy relay 150** which is also shown in Fig. 1 is associated in common with the special line equipments of all answering service privileged subscribers.

Normally, that is, when the subscriber is at or near his substation SB, key 11 is unactuated. If under this condition the subscriber wishes to initiate a call from this substation he lifts his receiver in the conventional manner whereupon conditioning relay 110 and line relay 120 are operated in series over the following loop circuit: ground, winding of relay 120, contact 133, jumper 14, positive conductor of line 12, hook switch contacts not shown of substation SB, negative conductor of line 12, jumper 13, contact 134, winding of relay 110, battery. Relay 110 in operating at 112 closes a point in a circuit extending from the CN conductor to start relay 140 but since relay 120 at 121 opens another point of this circuit relay 140 remains disconnected from the CN conductor. However, at 123 relay 120 in operating connects the winding of switching relay 130 to the last mentioned conductor and at 122 closes a direct loop by way of jumpers 15, 16 to the regular line equipment 18. This equipment accordingly acts to connect up an idle first numerical switch, for example, selector E of Gardner Patent 1,681,034 in the well known manner. Upon seizure of the regular line equipment 18 ground is connected therein to the CN conductor in the manner well known in the art to busy the calling line in the connector banks. In the instant case this ground also serves to operate switching relay 130 of the special line equipment in a circuit extending over jumper 17 and contact 123.

When relay 130 operates it disconnects relays 110 and 120 at contacts 134 and 133 respectively, thereby permitting these relays to release and at contacts 135 and 132 switches the subscriber's line through to its regular line equipment 18 by way of the following loop circuit: substation SB, line 12, jumpers 13 and 14, contacts 135 and 132, jumpers 15 and 16, negative and positive conductor of regular line equipment 18 respectively. Due to the release of relay 120 the short circuit across jumpers 15, 16 is removed at contact 122 and the operating circuit of relay 130 opened at 133, but the last mentioned relay locks over its own contact 131 and, in parallel thereto, contact 111 of relay 110. The subscriber at substation SB now actuates his calling device not shown in the usual manner, thereby to set up a call to any substation of the central office, say substation A' of Patent 1,681,034. When both subscribers involved in this call replace their handsets, the connection is released in accordance with conventional practice so that ground is removed from the CN conductor and relay 130, Fig. 1, accordingly restored to normal.

If substation SB receives an incoming call while line 12 is idle and key 11 in its normal position connector 19 after being set on the set of bank contacts shown operates to extend ground over test wiper C to the CN conductor. This ground not only operates the switching relay, not shown, of regular line equipment 18 in the usual manner, but also causes the operation of switching relay 130 in the special line equipment, Fig. 1, namely by way of contact 111 of conditioning relay 110 in its normal position. Relay 130 in operating at contacts 134, 133 frees the line of its attachments and at 135, 132 causes it to be switched through to the line terminals of the connector by way of jumpers 15 and 16. The ringing current projected from connector 19 will, therefore, actuate the bell not shown at substation SB in the conventional manner. When the subscriber at this substation lifts his handset to answer the call the ringing is cut off and the connection switched through in connector 19 as usual. After both parties have replaced their receivers at the end of the conversation ground is removed from the CN conductor 17 and switching relay 130 releases as described above for an outgoing call, thereby restoring the special line equipment Fig. 1 to normal.

When the subscriber wishes to leave his premises he may condition his line for secretarial answering service by operating key 11 at his station. This causes the operation of relay 110 in a circuit extending from ground through the contact of key 11, negative line conductor, jumper 13, contact 134, winding of conditioning relay 110 to battery. If the secretarial answering operator is under standing instructions from the subscriber actuation of his key 11 is the only operation required by the subscriber at the time he leaves his substation. On the other hand if the subscriber wishes to furnish the answering operator with specific instructions on this occasion he may do so by first calling her regular directory number over the switching equipment of the central office with key 11 still at normal. The line with which the secretarial answering operator is connected to the central office for the purpose of such calls has not been shown as it may correspond to the line of any other regular subscriber such as subscriber A' of the above Gardner patent. After passing the desired instructions on to the secretarial operator, the subscriber at station SB releases the connection to this operator by replacing his handset and subsequently actuates key 11.

The operation of the system according to the first embodiment will now be described for the case that an incoming call intended for line 12 is received while conditioning relay 110 is in operated condition. When connector 19 is set on the bank terminals corresponding to line 12 on such an incoming call ground connected to test wiper C of the connector in the usual manner will operate start relay 140 in a circuit extending over this test wiper, the CN conductor, jumper 17, contact 112 of conditioning relay 110, contact 121, conductor 20, winding of relay 140, contact 143 and from there over a chain circuit including contacts such as 141*b*, 141*a* and 141 through resistance 21 to battery. When start relay 140 operates it prevents at its contact 141 any other of the start relays from being subsequently operated; at its contact 142 it locks to battery through resistance 21 independently of the 141 contacts included in the above chain circuit; at 143 relay 140 opens another point in its own operating circuit; at 144 it completes an obvious circuit for common busy relay 150; at contact 145 connects conductor 20 to conductor 25 and at contact 146 disconnects conductor 20 from contact 151 of relay 150; and at contacts 147, 148 and 149 connects conductor 25 to conductors 24, 23 and 22 respectively. Conductor 23 is a level marking conductor and is employed only when Fig. 1 is used in conjunction with Fig. 3 but not when it is used with Fig. 2.

When busy relay 150 operates from ground at contact 144 it connects at its various make contacts ground to the conductors such as 20*a*, 20*b* respectively associated with the remaining special line equipments. Thus ground is connected at contact 152 by way of contact 146*a* to conductor 20*a* which is associated with the second privileged line and similiarly ground is connected at contact 153 by way of contact 146*b* to conductor 20*b* which is associated with the last of these privileged lines. This artificial grounding of the individual conductors 20 does not result in the operation of the associated start relays such as 140*a* and 140*b* for the reason that the operating circuit of these relays is open at contact 141 of relay 140, but the grounding of these conductors causes those of the privileged lines to be busied in the connector banks which because of the operated condition of their respective 110 relay happen to be conditioned for secretarial service at this time so that a direct connection extends between a given of these conductors 20 and the associated CN conductor. The artificial grounding of the CN conductors of these other answering conditioned lines thus has the effect that any party trying to reach one of these lines in an incoming call will receive busy tone from the connector in the usual manner, thereby to induce the calling party to repeat his call at some later time. This eliminates unnecessary waiting for such other calling parties during times when no trunking facilities to the answering agency are available.

Figure 2:
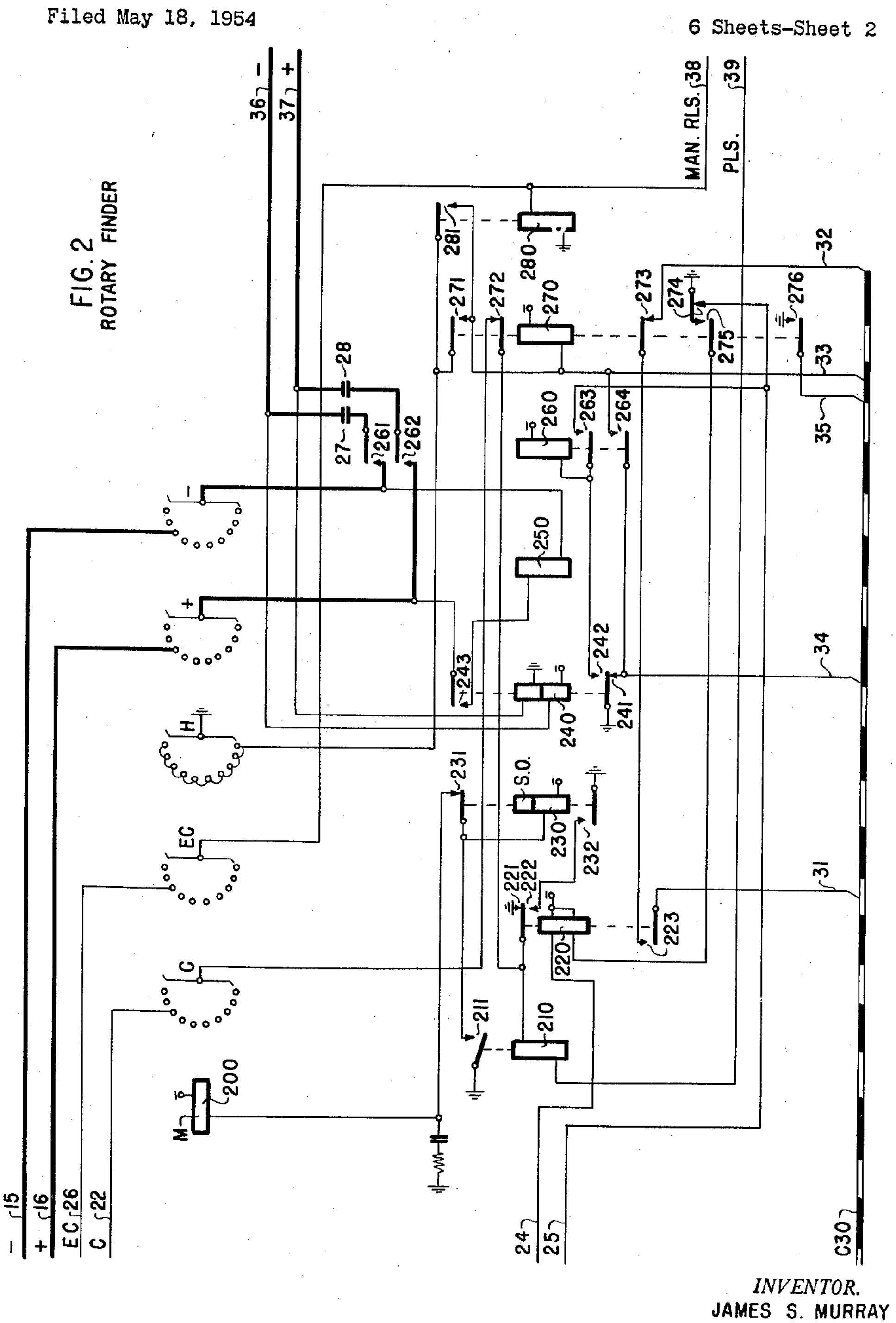
Fig. 2 is the circuit diagram of a finder of the rotary stepping type at the near end of the answering trunk.
Figure 4:
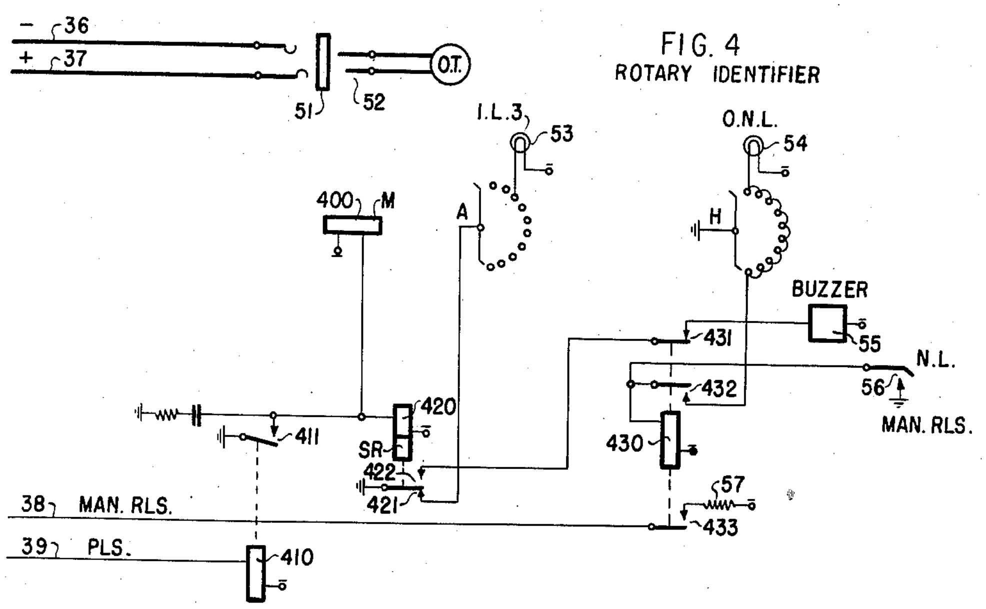
Fig. 4 is the circuit diagram of the answering apparatus at the distant end of the answering trunk for use in the first embodiment, said apparatus including an identifier switch of the rotary stepping type.
Figure 9:
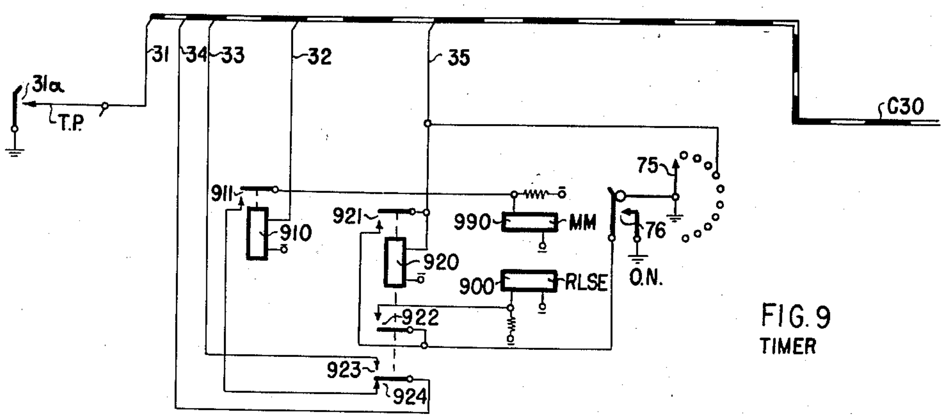
Fig. 9 is the circuit diagram of a timer of the rotary stepping type which may, if desired, be used in conjunction with Fig. 2 or Fig. 3.

Let it first be assumed that the special line equipment, Fig. 1, is used in conjunction with an answering trunk employing rotary switches at both ends thereof, as shown in Figs. 2 and 4; and let it further be assumed that this answering trunk is equipped with the automatic timer illustrated in Fig. 9.

The rotary finder shown in Fig. 2 which is assumed to be of the indirect stepping type has access to the special line equipments of the various privileged subscribers, the connections between the banks of this finder and special line equipment 110—140 only being shown in Fig. 2. This finder switch has in addition to its homing wiper and bank H four wipers and banks of which two, designated — and +, are the talking wipers and banks, C is the marking or test wiper and bank, and EC is an extra wiper and bank which together with the control conductors such as 26 connected thereto is not used in the instant embodiment involving Fig. 1. The answering trunk connecting this finder with the answering equipment, Fig. 4, at the distant end is a 4-wire trunk including jack ended talking conductors 36, 37, impulsing conductor 39 and manual release conductor 38. Pulsing relays 210, Fig. 2, and 410, Fig. 4, are normally operated over conductor 39, namely in the following circuit: ground, contact 221, winding of relay 210, conductor 39, winding of relay 410, battery. The identifier switch at the distant end also is a rotary stepping switch of the indirect drive type and has an identifying wiper and bank A and a homing wiper and bank H. Both switches have been shown as 10 point switches but any other bank capacity may, of course, be used for these switches.

When a start relay 140, Fig. 1, operates as above described the following circuit is closed for relay 220, Fig. 2: ground from contact 274 over conductor 25, and in multiple therewith ground from conductor 20 over contact 145, contact 147, conductor 24, upper winding of relay 220, battery. Relay 220 in operating at its contact 223 starts the timer, Fig. 9, in a manner described in detail hereinbelow and at contact 221 opens the aforementioned pulsing circuit extending over trunk conductor 39, thereby causing pulsing relays 210 and 410 to release. Relay 210 in restoring at contact 211 energizes magnet 200 of the finder switch by way of contact 231 and in parallel thereto energizes the winding of slow-to-operate relay 230. At the other end relay 410 in releasing at contact 411 causes stepping magnet 400 of the identifier switch and in multiple thereto slow-to-release relay 420 to be operated over an obvious circuit. Relay 230, Fig. 2, operates after a certain delay, thereby opening the circuit of magnet 200 at contact 231 and reclosing the impulsing circuit for relays 210 and 410 by way of contacts 232 and 222 so that both of these relays reoperate. Accordingly both magnets 200 and 400 release and both switches are advanced one step from their respective home positions. A predetermined time after the opening of contact 211 relay 230 releases, thereby repreparing the operating circuit for magnet 200 and reopening the impulsing circuit extending over conductor 39. As a result relays 210 and 410 again restore, thereby respectively energizing magnets 200 and 400 preparatory to the advancement of these switches to their second position. It will readily be seen that in this manner both switches are advanced in synchronism while relay 420 due to its slow release action remains operated during this advancement. At its contact 422 relay 420 cause buzzer 55 to be actuated by way of contact 431 during the advancement of the identifier switch. Off-normal lamp 54 is lit over an obvious circuit when homing wiper H engages its associated bank upon the first step of the last-mentioned switch, and as will be seen from this figure this lamp stays lit until the identifier switch again reaches its normal position upon release.

The special line equipment, Fig. 1, has been shown connected to the third contacts of the corresponding banks of the finder switch, Fig. 2. Thus as soon as the last-mentioned switch has reached its third position ground is connected to the right hand terminal of the winding of relay 210 over the following circuit path: ground on conductor 25, contact 149, conductor 22, C wiper of the finder switch in position three, contact 272, right hand terminal of relay 210. This ground connection causes the immediate reoperation of relays 210 and 410 after the two switches have taken their third step, whereby the reoperation of magnets 200 and 400 and therefore, any further advancement of the two switches is prevented. Also since no further impulses are received by relay 410, Fig. 4, relay 420 releases after a slight delay, thereby causing calling or identifying lamp 53 to be lit over the following circuit: ground, contact 421, A wiper of the identifier switch in position three, lamp 53, battery. Lamp 53 is individually associated with substation SB whose line equipment is shown in Fig. 1 and in a similar manner the identifying lamps not shown of other answering service privileged subscribers are connected to the other contacts in the A bank of the identifier switch.

When the secretarial operator notices the lighting of calling lamp 53 she inserts plug 52 which is connected to her telephone instrument OT into jack 51 terminating the talking conductors 36, 37 of the answering trunk. The loop circuit accordingly is closed by way of these talking conductors to the windings of relay 240 Fig. 2 so that this relay operates, thereby at contact 241 stopping the timer, at 242 causing the operation of relay 260 and at 243 bridging impedance 250 across the talking conductors of the finder switch. Relay 260, upon operating at contact 263 locks to ground on conductor 25; at 264 prepares the operation of release relay 270 and at 261, 262 switches the talking circuit through in the finder. Due to the connection of impedance 250 across the talking conductors the ringing is tripped in connector 19 and the talking circuit switched also through in this connector in the well known manner.

It should be understood that in the present embodiment the transmission of ringing current by the connector is wholly without effect. In particular, due to the fact that special switching relay 130, Fig. 1, is unoperated and the subscribers line accordingly open at contacts 135, 132 the bell at substation SB is not rung on calls incoming to this line while the special line equipment, Fig. 1, is conditioned for answering service. For this reason the invention also makes it possible for the subscriber at station SB to disable his ringer by simply actuating his key 11 if, at certain times, say during a conference in his office, he does not wish to be disturbed by the ringing of his bell and yet be sure that calls directed to his line are answered.

As the lighting of calling lamp 53 identifies the called subscribers line to the answering operator she will answer the call in accordance with previous instructions given to her by that subscriber, that is, she may answer the call by directly referring to the number or name of the called subscriber and then either give or take a message as the circumstances may require.

At the end of the conversation, both the calling party and the secretarial operator release the connection, the release by the operator being effected by withdrawal of plug 52 from jack 51. When the loop across answering conductors 36, 37 is thus opened relay 240 releases, thereby at 243 reopening the answering loop to the connector and at 241 causing the operation of release relay 270 by way of contact 264. When relay 270 operates it removes at contact 274 a multiple ground from the lower terminal of start relay 140, the other multiple ground extended to this terminal over conductor 20 being removed when the connector disconnects ground from its C wiper responsive to the opening of the answering loop at contact 243. At 272 relay 270 disconnects stopping ground from the right hand terminal of relay 210; at 275 it holds relay 220 operated over its lower winding independently of ground extended over contact 147; at contact 271 relay 270 locks to ground forwarded over homing wiper H of the finder switch; and at 273 and 276 effects the release of the timer. Connector 19 releases responsive to the release of the connection by both the calling party and the operator.

When relay 140 restores incident to the above removal of ground from its lower terminal relay 150 also is permitted to release so that artificial busying ground is removed from the connector bank terminals of the remaining service conditioned subscribers. At 141 relay 140 recloses the chain circuit, thereby allowing any of the start relays to operate in response to further incoming calls. As all ground connections to the right hand terminal of relay 210 have been removed both this relay and relay 410 at the distant end restores. Accordingly contacts 211 and 411 reclose and the interaction between relays 230 and 210, 410 is resumed to cause the homing of both rotary switches in unison. When homing wiper H, Fig. 2, disengages its associated bank upon the finder switch reaching its home position, the locking circuit of relay 270 is opened so that this relay releases, opening the circuit of the lower winding of relay 220 at its contact 275. If no other call is waiting for service, relay 220 accordingly releases also, thereby reclosing the circuit extending over conductor 39 at contacts 221 to cause the reoperation of both relays 210 and 410. At this time the identifier switch also has reached its normal position so that off-normal lamp 54, Fig. 4, is extinguished.

Release key 56, Fig. 4, which is of the non-locking type has been provided to enable the secretarial operator if she so desires to release the answering trunk and its associated equipment without first placing this trunk into answering condition, i. e. inserting plug 52 into jack 51. Special release relay 430 operates in response to the actuation of key 56 and at 432 places itself into a locking circuit extending over the homing wiper and bank of the identifier switch; and at 433 connects resistance battery to trunk conductor 38 so that special release relay 280, Fig. 2, operates over the following circuit: ground, winding of relay 280, conductor 38, contact 433, resistance 57, battery.

Relay 280 in operating at 281 causes the operation of release relay 270 from ground at homing wiper H, Fig. 2, and the operation of this last mentioned relay initiates the release of the trunk in the manner explained above. When the identifier switch reaches its home position its homing wiper disengages its associated bank so that the locking circuit of relay 430 is broken and this relay also permitted to restore.

The timer shown in Fig. 9 is provided if it is desired that the answering trunk and its associated equipment be released after a predetermined time interval when the secretarial operator fails to answer a call extended to her over this trunk. When relay 220 operates upon seizure of the finder, time pulse conductor TP, Fig. 9, is connected at 223 to the winding of relay 910 by way of the following circuit: ground, cam contact 31*a* of a common interrupter machine of any suitable type provided in the central office, TP conductor 31 forming part of cable C30, contacts 223, 273, conductor 32, winding of relay 910, battery. Due to the ground pulses applied in this manner at suitable intervals to the winding of relay 910 the last mentioned relay is periodically operated and upon each operation of this relay a ground pulse is sent at contact 911 to stepping magnet 990 of the timer switch, namely over the following circuit: ground, contact 241, conductor 34, contacts 924 and 911, magnet 990, battery. The timer switch which has been assumed to be of the minor switch type advances its wiper 75 one step for each actuation of magnet 990, off-normal contact 76 being closed without effect upon the first step of this switch.

In the instant case conductor 35 is shown connected to the fourth contact in the bank of the timer switch. Accordingly when wiper 75 reaches its fourth position without the call having been answered by the secretarial operator relay 920 operates from ground at wiper 75. At 921 relay 920 places itself into a locking circuit extending over off-normal contact 76 and at 922 causes the actuation of release magnet 900 in a circuit extending from ground at this off-normal contact through contact 922 and the winding of release magnet 900 to battery. This causes the release of the timer switch and accordingly the release at contact 76 of relay 920 but the last-mentioned relay stays operated long enough to insure the operation of finder release relay 270 over the following circuit: ground, contact 241, conductor 34, contact 923, conductor 33, winding of relay 270, battery. Relay 270 at 271 places itself into a locking circuit and causes the release of the answering trunk in the manner above described.

On the other hand, should the secretarial operator answer the call before timer switch wiper 75 has reached its fourth bank contact the operation of answering relay 240 removes ground from the operating circuit of timer magnet 990 at contact 241 so that the further advancement of the timer switch is prevented. Subsequently when the operator withdraws her plug and release relay 270 operates incident to the release of relay 240 as described above the circuit of relay 910 is opened at contact 273 and relay 920 operated by the application of ground to conductor 35 at contact 276. Relay 920 then causes the release of the timer switch in the manner explained above.

Reverting now to the functioning of the special line circuit, Fig. 1, when the subscriber later returns to his substation SB he may remove the conditioning of the special line equipment by restoring his key 11 to normal, thereby permitting conditioning relay 110 to release. As the special line equipment, Fig. 1, has now been fully restored to normal incoming calls subsequently received by subscribers line 12 will actuate the bell at substation SB in the ordinary manner without causing the seizure of the answering trunk and outgoing calls initiated by the subscriber at substation SB also take place over the switching equipment of the central office in the usual manner, viz. as above described. In particular if the subscriber at substation SB upon restoring his key 11 removes his handset and then dials the regular directory number of the secretarial operator he may obtain from her any required information about calls that have been answered by this operator during his absence.

However, should the subscriber restore his key 11 at a time when an incoming call directed to his line, already extended to or answered by the secretarial operator over the answering trunk or not, is still in existence, switching relay 130 will immediately operate from ground on the CN conductor by way of jumper 17 and contact 111 of relay 10 in normal position. If under this condition the subscriber at substation SB initiates a call by lifting his receiver relays 110 and 120 are prevented from operating due to their circuits being open at contact 134 and 133 respectively and the subscriber is directly switched onto the incoming call by way of subscribers line 12, jumpers 13 and 14, closed contacts 135 and 132 and jumpers 15 and 16. If the incoming call has not yet been fully extended to or answered by the secretarial operator the closure of the loop over subscribers line 12 will trip the ring and cause the switch-through in connector 19, and the subscriber at substation SB may then answer the call in the regular manner. On the other hand, if the secretarial operator has already answered the call and is still on the line then the subscriber at substation SB is merely switched as a third party onto the existing conversation and he may dispose of the call according to circumstances.

Figure 3:
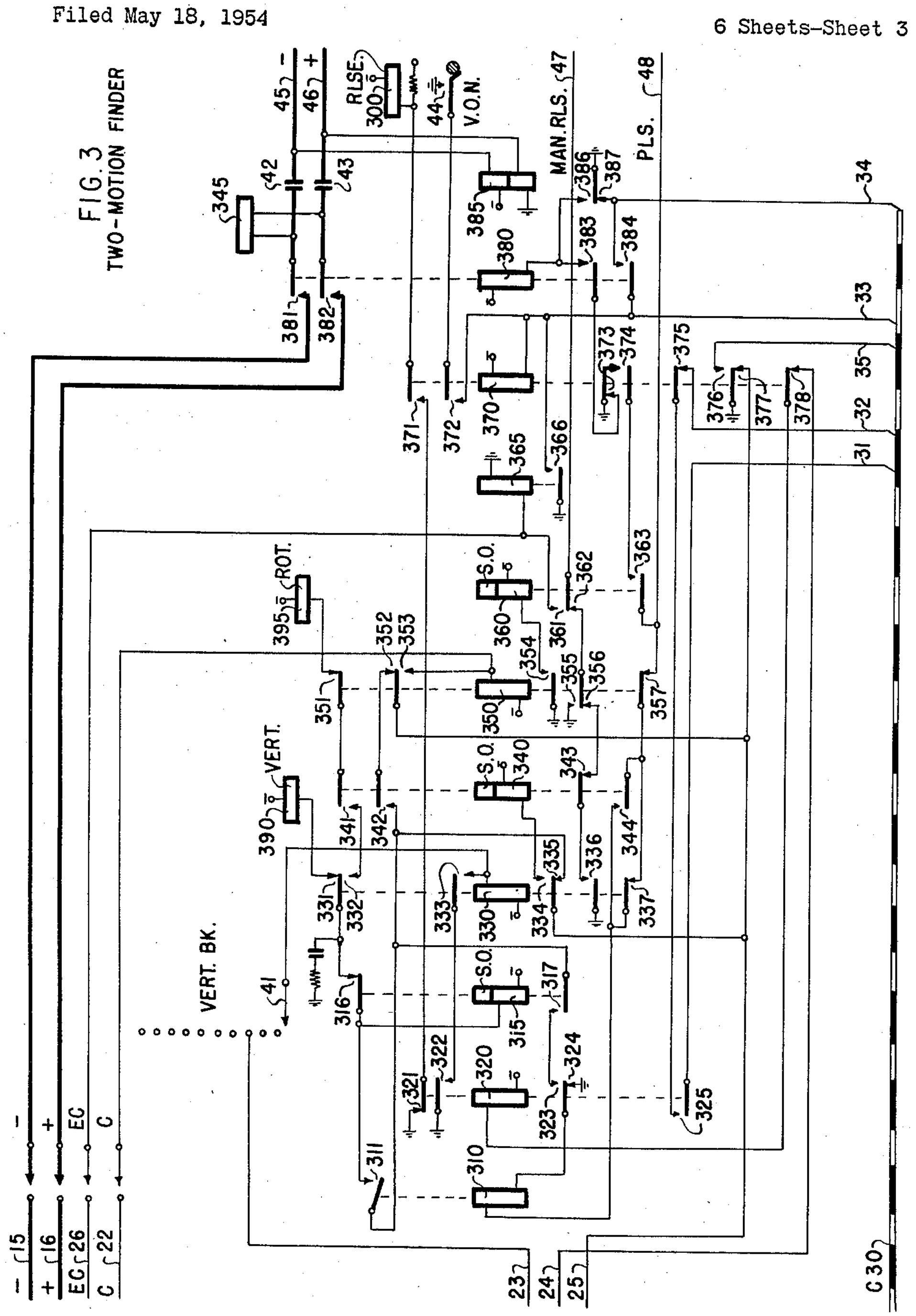
Fig. 3 is the circuit diagram of a Strowger finder which may alternatively be used at this end of the answering trunk.
Figure 5:
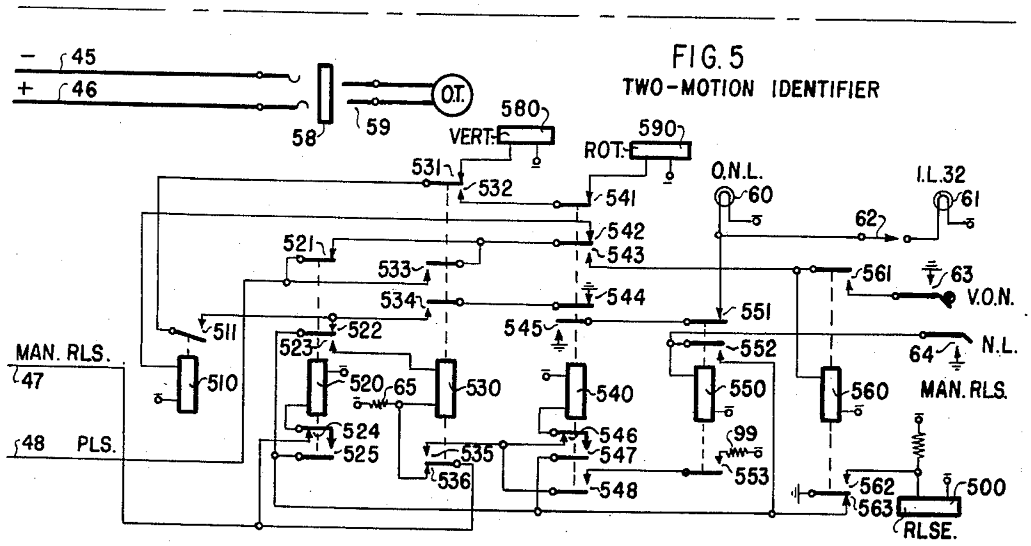
Fig. 5 is the circuit diagram of the answering apparatus at the distant end of the answering trunk and including a Strowger type identifier switch.

Having thus described the functioning of the first embodiment in conjunction with Figs. 2 and 4 the operation of this embodiment will now be explained for the case that the answering trunk is equipped with two-motion switches according to Figs. 3 and 5. Both the finder switch, Fig. 3, and the identifier switch, Fig. 5, may be Strowger switches of conventional design. More particularly and as illustrated in Fig. 3, the finder switch has a set of four wipers and contact banks, designated −, +, C and EC, although the last-mentioned wiper and bank together with its associated control conductors such as 26 again remains unused in the instant case. The Strowger switch, Fig. 3, may give access to as many as one hundred special line equipments, only the connections to special line equipment 110 to 140, however, being shown in this figure. More specifically it is assumed that the last-mentioned line equipment is connected to the second rotary position in the third level of the finder bank so that the identifying number of substation SB as far as the answering system, Figs. 3 and 5, is concerned is 32. The finder switch also has a vertical wiper 41 and an associated contact bank and according to the foregoing assumption level-marking conductor 23 is shown connected to the third contact in this bank.

The answering trunk itself again has four conductors namely negative conductor 45, positive conductor 46, synchronizing and manual release conductor 47 and pulsing conductor 48. The Strowger switch at the other end needs to have only one wiper 62, and to the associated contact bank up to one hundred identifying lamps such as lamp 1L32 identifying called substation SB, may be connected. The two pulsing relays in this case are 310 and 510 and these two relays are normally operated over the following circuit: ground, contact 324, winding of relay 310, contacts 337 and 357, conductor 48, contacts 521 and 542, winding of relay 510, battery.

Let it again be assumed that the subscriber at substation SB has conditioned his line for answering service by operating relay 110 under the control of key 11 and that subsequently an incoming call is received and start relay 140 accordingly operated and locked. Upon the operation of this relay the following circuit is closed for relay 320: ground on conductor 24, viz. by way of contact 377 and conductor 25 or by way of conductor 20 and contact 145, contact 378, winding of relay 320, battery. Relay 320 upon operating at 325 starts the timer and at 324 causes the release of pulsing relays 310 and 510. Relay 310 in releasing at 311 energizes slow-to-operate relay 315 and operates vertical magnet 390, namely in the following circuit: ground on conductor 25, contacts 335 and 311, and thence through the winding of relay 315 to battery and, in parallel thereto, through contacts 316, 331 and the winding of magnet 390 to battery. The finder switch accordingly takes its first vertical step. When relay 510 releases at the other end the closure of contacts 511 establishes the following circuit for vertical magnet 580 of the identifier switch: ground, contacts 544, 534, 511, 531, magnet 580, battery. This advances the identifier switch by one vertical step also.

When relay 315, Fig. 3, operates after a predetermined delay it opens the circuit to magnet 390 at contact 316 so that this magnet releases; and at 317 recloses the pulsing circuit over the following circuit path: ground on conductor 25, contacts 335, 317, 323, winding of relay 310, contacts 337, 357, conductor 48, contacts 521, 542, winding of relay 510, battery. Relay 310 in reoperating at 311 opens the energizing circuit of relay 315 and relay 510 in reoperating at its contact 511 causes the release of magnet 580 of the identifier switch. The first vertical step of both switches has now been completed. After a while slow-to-operate relay 315 again releases, thereby causing the release of pulsing relay 310 and 510 and accordingly the reactuation of magnets 390 and 580 for the second vertical step.

Due to this interaction of relays 315 and 310, 510 the two Strowger switches are, therefore, advanced in a vertical direction until a marked level is found by vertical wiper 41. When this occurs relay 330 operates in a circuit extending from ground on conductor 25, contact 148, conductor 23, vertical wiper 41 in position three, winding of relay 330, battery. Relay 330 at 333 locks to ground at contact 322; at 337 opens the pulsing circuit, thereby preventing relays 310 and 510 from reoperating for the time being; at 335, 334 transfers ground on conductor 25 from the magnet operating circuit to the winding of slow-to-operate relay 340; at 331, 332 transfers the magnet operating circuit from the winding of vertical magnet 390 to that of rotary magnet 395 preparatory to the secondary advancement of the finder switch; and at 336 initiates the transmission of a synchronizing pulse over trunk conductor 47 by grounding this conductor. This causes the operation of relay 520, Fig. 5, over the following circuit: ground, contacts 336, 343, 356, 362, conductor 47, contact 524, winding of relay 520, battery. Relay 520 locks at contact 525 to ground at contact 563; at 523 connects this last-mentioned ground to the upper terminal of relay 530, this relay, however, being kept from operating as long as its lower terminal is connected to ground by way of conductor 47 and contact 536; and at 521 relay 520 opens a point in the pulsing circuit at this end.

Relay 340, Fig. 3, operates after a predetermined interval thereby closing at 344 a point in the pulsing circuit extending over conductor 48, this circuit however still being open at various contacts. At 341 relay 340 closes a point in the circuit of rotary magnet 395 and at 342 closes another point in this pulsing circuit, thereby also operating rotary magnet 395 and energizing slow-to-operate relay 315, namely in a circuit extending from ground on conductor 25 over contacts 352, 342, 311 and thence through the winding of relay 315 to battery and, in multiple therewith, through contacts 316, 332, 341, 351 and the winding of magnet 395 to battery. At 343, finally, ground is removed from conductor 47 to terminate the synchronizing pulse and thereby permit relay 530, Fig. 5, to operate over the following circuit: ground, contacts 563 and 523, winding of relay 530, resistance 65, battery. When relay 530 operates it transfers the magnet operating circuit from the vertical to the rotary magnet of the identifier switch at contacts 531, 532; at 533 re-prepares the pulsing circuit over conductor 48 as far as the answering end of the trunk is concerned; at 535 closes a point in the circuit of relay 540; and at 534 causes the operation of rotary magnet 590 in a circuit which may be traced from ground, through contacts 544, 534, 511, 532, 541, winding of magnet 590 to battery. As a result of the actuation of their respective rotary magnets both switches accordingly take their first rotary step.

After a slight delay slow-to-operate relay 315, Fig. 3, operates, thereby at 316 permitting rotary magnet 395 to release and at 317 effecting the reoperation of pulsing relays 310 and 510 as a result of which relay 315 again is deenergized and, at the other end, rotary magnet 590 released. After another slight interval slow-to-operate relay 315 accordingly releases to permit both pulsing relays to restore again, thereby causing both switches to take a second rotary step. The finder switch now engages the set of contacts in its bank to which conductors 15, 16 and 22 are connected and the identifier switch at the distant end has been positioned by virtue of its synchronous operation in relation to the finder switch, in the corresponding position 32 wherein wiper 62 connects up with lamp 61 identifying substation SB.

The following test circuit is now established for finder test relay 350: ground on conductor 25, contact 149, conductor 22, C wiper of the finder switch in position 22, winding of relay 350, battery. Relay 350 at contact 351 causes the release of rotary magnet 395 whereby the second rotary step of this switch is completed; at 352 opens another point in the circuit of the last-mentioned magnet, at the same time opening the circuit of relay 315; at 353 locks to ground on conductor 25; at 357 opens another point in the pulsing circuit extending over conductor 48; at 355 again initiates the transmission of a synchronizing or control pulse over conductor 47; and at 354 causes the energization of slow-to-operate relay 360 in an obvious circuit.

At the answering end of the trunk, relay 540 operates in response to the last-mentioned control pulse in a circuit extending from ground at contact 355 through contact 362, conductor 47, contacts 535 and 546, winding of relay 540 to battery. At contact 541 relay 540 in operating causes the release of rotary magnet 590, thereby completing the last rotary step of the identifier switch; at 542 opens another point in the pulsing circuit extending over conductor 48; at 543 prepares a circuit to release relay 560; at 544 disconnects ground from the magnet operating circuit at this end; at 545 causes the lighting of lamps 60 and 61 in a circuit extending from ground over contacts 545 and 551 and from there through off-normal lamp 60 to battery and in parallel therewith through wiper 62 in position 32 and calling lamp 61 to battery; at 547 locks to ground at contact 563; at 546 opens its own operating circuit; and at 548 prepares the connection of resistance battery to conductor 47.

Upon noticing the lighting of calling lamp 61 the operator answers the call by inserting plug 59 into jack 58, thereby causing the operation of answering relay 385 over the following loop circuit: operator's telephone instrument OT, plug 59, jack 58, talking conductors 45, 46 of the answering trunk, upper and lower winding of relay 385 to battery and ground respectively. Relay 385 at contact 387 removes ground from conductor 34, thereby stopping the timer, and at 386 causes the operation of relay 380 in an obvious circuit. The last-mentioned relay closes its own locking circuit at 383 by way of contact 373; at 384 prepares a circuit for release relay 370 and at 381, 382 switches the answering trunk through in Fig. 3. As a result of the closing of contacts 381, 382 impedance 345 is now bridged across the talking wipers of the finder switch. As a result the ring is tripped and the talking conductors are switched through in connector 19. The talking circuit now extends from the calling party through the initial switching stages, not shown, in the central office by way of the talking wipers of connector 19, jumpers 15, 16, talking wipers of the finder switch in position 32, contacts 381, 382, condensers 42, 43, talking conductors 45, 46 of the answering trunk and jack 58 and plug 59 to the telephone instrument OT of the secretarial operator. This operator accordingly may take any message from or give any instructions to the calling party depending on the circumstances of the case.

At the end of the conversation with the calling party the operator withdraws plug 59 from jack 58, thereby causing the release of relay 385. Release relay 370 is now operated in a circuit which may be traced from ground through contacts 387, 384, winding of relay 370 to battery. Relay 370 at contact 372 locks to ground at vertical-off-normal contact 44; at 371 prepares the circuit for release magnet 300; at 375 and 376 releases the timer; at 378 insures the release of relay 320; at 377 removes a multiple ground from conductor 25, the other ground connection to this conductor being removed at the time ground is disconnected from the CN conductor in the connector. At 373 relay 370 opens the locking circuit of relay 380 so that the last-mentioned relay restores; at 374 relay 370 connects ground to conductor 48. Connector 19 releases after both the calling subscriber and the answering operator have disconnected.

When ground has been removed from both conductors 25 and CN as just described relays 140 and 150 release in the manner explained above and relays 340, 350, Fig. 3, also are permitted to restore. When relay 350 restores relay 360 likewise is freed although with a certain delay. When relay 320 restores it opens at 322 the locking circuit of relay 330 to permit this relay to release; at 321 closes the circuit to release magnet 300 by way of contact 371; and at 324 closes a point in the circuit of relays 310 and 510. Upon the actuation of release magnet 300 the finder switch mechanism is restored to normal in the usual manner whereupon the circuit of locking relay 370 is opened at contact 44 and this relay accordingly also permitted to release. At 371 the circuit of release magnet 300 is reopened and at 374, or possibly earlier at contact 363, ground again disconnected from conductor 48. At 378 the circuit is reprepared for relay 320 to ready this relay for operation on other waiting calls.

At the other end of the trunk the ground pulse thus transmitted over conductor 48 causes the operation of relay 560 by way of contacts 523 and 543. Relay 560 at contact 561 locks to vertical-off-normal contact 63; at 563 lets relays 520, 530 and 540 restore and at 562 operates release magnet 500 over an obvious circuit. As a consequence the mechanism of the identifier switch also is restored to normal and at this time the locking circuit of relay 560 itself is opened at vertical off-normal contact 63 so that this relay likewise releases. With relays 520 and 540 at normal and contacts 521 and 542 accordingly reclosed the operating circuit for pulsing relays 310 and 510 is reclosed so that these two relays reoperate in series with each other. Moreover, lamps 60 and 61 are extinguished at contact 545. At this time both ends of the answering trunk and also the special line equipment have been fully restored to normal condition.

If the secretarial operator upon receipt of a call wishes to release the answering trunk without going through an answering operation she may do so by momentarily depressing her non-locking release key 64, thereby operating relay 550 over an obvious circuit. Relay 550 at contact 552 locks to ground at contact 563; at 551 opens the circuit to lamps 60 and 61 and at 553 connects resistance battery to conductor 47, thereby to operate relay 365 over the following circuit: battery, resistance 99, contacts 553, 548, 535, conductor 47, contact 361, winding of relay 365, ground. Relay 365 at its contact 366 operates relay 370 over an obvious circuit and the last-mentioned relay initiates the release of the trunk and its associated equipment in the manner explained above. When relay 560, Fig. 5, restores upon the release of the identifier switch mechanism the locking circuit of relay 550 is opened at contact 563 so that this relay also is permitted to release.

The functioning of the timer, Fig. 9, when used in connection with Fig. 3 corresponds closely to its above described operation in conjunction with Fig. 2 so that a detailed explanation of the automatic release of the trunk, Figs. 3 and 5, under the control of this timer is believed to be unnecessary. The removal of the conditioning of the special line equipment, Fig. 1, upon the return of the subscriber to his substation SB also takes place as previously described.

*Second embodiment*

Referring now to Fig. 6, there is illustrated an answering service line equipment of simple design which is merely patched onto the associated subscribers line such as line 65 of substation SB, e. g. by means of jumpers 66, 67 run to the corersponding MDF terminals. While only one of these equipments has been shown in Fig. 6 it will be understood that one such equipment is provided for each subscriber entitled to answering service. The special line equipment according to this modification includes a ring-up relay 620 in addition to a start relay 630. The provision of such a ring-up relay makes it possible to provide the secretarial operator with facilities for recognizing calls that have become abandoned by the calling party or answered by the called subscriber ahead of the operator and for accordingly effecting the immediate release of the trunk on such calls; and it also makes it possible to selectively extend calls to this operator for answering purposes, that are directed to a given subscriber on a party line.

Fig. 6 also shows a conditioning relay 610 the upper or operating winding of which is connected to a CN–1 conductor 70 and the lower or locking winding of which is connected through contact 611 to a CN–2 conductor 71. These two conductors, in turn are connected to the test terminals of two special sets of connector bank contacts respectively corresponding to two special numbers tha may be dialed into the connector, the first serving to condition particular line equipment, Fig. 6, for answering service and the second serving to remove the service condition. However, conditioning relay 610 may be omitted if desired, and if it is, straps 72 and 73 are furnished in its place.

It will be readily seen from Fig. 6 that outgoing calls from substation SB' take place in the usual manner, that is in this case without involving the special line equipment for answering service. More particularly, when the subscriber at station SB' lifts his receiver to initiate an outgoing call, regular line equipment 67, Fig. 6, which again may be similar to the line equipment C of the abovementioned Gardner patent, acts to connect the calling subscriber with a first numerical switch, and the calling subscriber may then complete the connection to any desired party in the central office in the conventional manner.

Assuming first that the special line equipment, Fig. 6, is equipped with conditioning relay 610 and that this relay is in its normal condition, calls incoming to substation SB′ also take place without any functioning of this special line equipment for the reason that the circuit to ring-up relay 620 is open at contacts 612 and 613.

When the subscriber at station SB′ leaves his premises he may condition his special line equipment, Fig. 6, for answering service by lifting his receiver and then dialling the conditioning number only known to him into the switching equipment of the central office. Connector 68 which may correspond to connector H of Gardner Patent 1,681,034, accordingly is positioned on the above-mentioned first special set of bank terminals wherein its C wiper has access to CN–1 conductor 70. Therefore when this connector switches through upon its test relay, not shown, encountering battery through the upper winding of relay 610 ground is connected to the C wiper of connector 68 in the usual manner and the last-mentioned winding of relay 610 accordingly energized by way of this test wiper and CN conductor 70. Relay 610 upon operating at its contact 611 places itself into a locking circuit extending from ground through its lower winding, contact 611 and resistance 69 to battery; and at 612, 613 completes the connection of ring-up relay 620 to the subscribers line, namely by way of jumpers 67, 66 and condenser 74. After subscriber SB′ releases this conditioning connection relay 610 remains operated by virtue of the just mentioned locking circuit.

Before dialling the conditioning number as just described subscriber SB′ may, of course, set up a connection to the secretarial operator by dialling her regular directory number as explained in connection with the first embodiment, for the purpose of giving the operator any required instructions. In doing so he may also request the answering operator to dial the conditioning number for him if he so desires.

If a call directed to subscribers line 65 is received during the absence of the called subscriber from substation SB′, i. e. while relay 610 is in operated condition, the connector used in this call, for example, connector 68 tests idle by way of test conductor CN, the cut-off relay not shown of regular line equipment 67 and battery and projects ringing current over the called subscribers line 65 in the usual manner. As a result the bell at this substation is rung and in parallel thereto ring-up relay 620 is operated by way of jumpers 66, 67, contacts 612, 613 and condenser 74. As no locking arrangements are provided for the last-mentioned relay it intermittently operates in response to each splash of ringing current transmitted by the connector.

Let it first be assumed again that an answering trunk having rotary switches at both its ends is used, that is that Figs. 2 and 7 and, if desired, Fig. 9 are employed. When relay 620 operates in response to the first splash of ringing current received from connector 68 the following circuit is closed for start relay 630: ground, contact 274, Fig. 2, conductor 25, contact 621, Fig. 6, contact 632, winding of relay 630, battery. Relay 630 in operating at 632 opens its operating circuit; at 631 locks to ground on conductor 25 and at 633, 634 and 635 extends the last-mentioned ground to conductors 22, 23 and 24 respectively. Conductor 23 which serves as a level-marking conductor in conjunction with Fig. 3 only, is not connected in the instant case.

The connection of ground to conductor 24 operates relay 220 of the finder switch, Fig. 2, and this switch accordingly is positioned on the calling line equipment under the control of test conductor 22 in the manner explained above in connection with the first embodiment. Test conductor 22 again is assumed to be connected to the third contact in the C bank of the finder.

Reverting now to the distant end of the answering trunk the identifier switch at this end shown in Fig. 7 corresponds in many respects to the identifier switch disclosed in Fig. 4 except that the identifier switch Fig. 7 has an additional relay 730. The answering plug 78 and jack 77 Fig. 7 correspond respectively to the answering plug 52 and jack 51 shown in Fig. 4.

During the automatic advancement of the finder switch Fig. 2 in search of the calling line equipment stepping pulses are transmitted over pulsing conductor 39 so that relay 710 is released and reoperated three times as above explained for relay 410 in the case of the first embodiment. At contact 711 the circuit of stepping magnet 700 accordingly is intermittently closed and the identifier switch advanced to its third position corresponding to the position in which the finder switch, Fig. 2, was arrested. Slow-to-release relay 720 is operated from contact 711 during the advancement of the identifier switch but restores with a slight delay at the end of the impulse series. Therefore, if ring-up relay 620 operates responsive to the next splash of ringing current or if it already happens to be operated at the time contact 721 of relay 720 recloses, the following circuit is closed for flashing relay 730: ground on conductor 25, contact 621, EC conductor 26, EC wiper of the finder switch Fig. 2 in position 3, trunk conductor 38, contacts 743 and 721, winding of relay 730, battery.

Relay 730 operates in response to each ground pulse received over trunk conductor 38 under the control of ring-up relay 620, thereby at 731 actuating buzzer 81 over an obvious circuit and at 732 lighting the identifying lamp 79 associated with substation SB′ by way of the A wiper of the identifier switch in position 3. It will be noted from Fig. 2 that the ground-connected winding of relay 280 is connected to trunk conductor 38 during this transmission of direct ground pulses thereover by contact 621. However, the windings of relays 280 and 730 both are of high resistance and are so dimensioned that neither of these two relays can operate or hold when in series with the other relay; however, as explained in detail hereinbelow relay 280 does operate when connected in series with low-ohm resistance 83, Fig. 7.

Upon noticing the intermittent lighting of calling lamp 79 the secretarial operator answers the call by inserting plug 78 into jack 77, thereby causing the operation of relays 240 and 260, Fig. 2, as explained for the first embodiment. More particularly, when the answering loop is closed to the connector at contact 243 of relay 240 the ringing is tripped in the connector and ring-up relay 620 accordingly kept from operating any further. As a result relay 730 also remains at normal and calling lamp 79 ceases to flash. Off-normal lamp 80, however, which was lit by way of homing wiper and bank H of the identifier switch when this switch took its first step, remains illuminated until the switch returns to its home position upon release.

At the end of the conversation with the calling party, the secretarial operator releases the trunk by removing plug 78 from jack 77. This brings about the operation of release relay 270 as explained hereinbefore and accordingly the removal of ground from conductor 25. Start relay 630, therefore, releases and the finder switch, Fig. 2, returns to normal as described above. During the advancement of the finder switch to its home position corresponding pulses are transmitted over pulsing conductor 39 so that the identifier switch Fig. 7, is homed in unison with the finder switch under the control of relay 710. The off-normal lamp 80 at this end accordingly is extinguished and relay 720 permitted to release with a slight delay. All the equipment involved in the answering system has thus been returned to normal with the exception of conditioning relay 610, Fig. 6.

It may happen that the calling party abandons the call before the secretarial operator is able to answer it; or the situation may be such that subscriber SB′ returns to his substation just at the time the incoming call is received and upon lifting his receiver in response to the ringing of his bell trips the ringing and causes the switch through in connector 68 in the usual manner. In both cases the transmission of ringing current by this connector will stop and ring-up relay 620 accordingly cease to be intermittently operated. As a consequence relay 730 also is no longer operated and calling lamp 79 no longer flashed. Under this condition the fact that off-normal lamp 80 is still lit over the H wiper and bank of the identifier switch without any calling lamp 1L being flashed serves as an indication to the secretarial operator that the call has either been abandoned or has been answered by the calling subscriber himself.

Under these circumstances manual release key 87 affords a convenient means to the operator for immediately releasing the trunk without first placing it in answering condition by insertion of plug 78. Release relay 740 operates over an obvious circuit in response to the actuation of release key 82 and upon operating at contact 741 locks to ground at homing wiper H, Fig. 7, and at 742 effects the operation of relay 280, Fig. 2, over the following circuit: ground, high resistance winding of relay 280, conductor 38, contact 742, low-ohm resistance 83, battery. Relay 280 in operating effects the advancement of the finder switch, Fig. 2, and in synchronism therewith the advancement of the identifier switch, Fig. 7, to their respective home positions in the manner hereinbefore described. When the last-mentioned switch reaches its home position off-normal lamp 80 is extinguished and relay 740 permitted to restore to normal.

If overlapping calls are made to a number of service-conditioned subscribers lines these calls will be "picked up" by the line finder, Fig. 2, in the order in which the corresponding line equipments are connected to the C bank of the finder switch. However, in each case the two switches are first advanced to their home position, viz. when the operator releases the trunk, in one way or the other, as just described. Thus, assuming for purposes of illustration, that an incoming call is received by another conditioned line equipment accessible, say, over position 8 of the finder switch, at about the time that the line equipment, Fig. 6, is seized, both line equipments will have their start relays operated and locked. The finder switch will then be started and arrested in position 3 and at the end of the conversation released to its home position all as above described. When relay 270 operates to initiate this release the locking circuits of the start relays such as 630 of both line circuits are opened at contact 274 so that both relays may release and the finder testing circuit is held open at 272 during the homing of the switch. However, if the call to the other line circuit has not been abandoned or has not been answered by the corresponding subscriber himself in the meantime the start relay of this line circuit will again operate due to the continued intermittent operation of the associated ring-up relay and lock to conductor 25 as soon as ground is reconnected to this conductor upon the release of relay 270. The two switches therefore, are started anew and in this case arrested on the position 8, marked by this other line circuit. The flashing of the calling lamp, not shown, which is connected to the eighth contact in the A bank of the identifier switch will thus indicate to the operator the existence and identity of the second call.

Reverting again to the operation of the line equipment, Fig. 6, when subscriber SB′ returns to his substation he will initiate a call to the secretarial operator by simply lifting his receiver and dialling the regular directory number of this operator into the switching equipment of the central office to check with the operator as regards calls received by her during his absence. Either the subscriber himself after momentarily replacing his receiver, or else the operator, may now dial the service-condition-removal number so that ground is applied by way of the C wiper of the connector such as 68 used in this connection and the CN–2 conductor, 71, associated with this number to the left hand terminal of resistance 69 whereby the lower winding of relay 610 is short-circuited. Conditioning relay 610 accordingly releases, thereby disconnecting the ring-up relay 620 from subscribers line 65. The special line equipment, Fig. 6, has now been fully restored to its normal condition.

As mentioned above conditioning relay 610 may be omitted if desired and in that case straps 72 and 73 are provided instead. With the special line circuit, Fig. 6, reduced to this simple form all calls directed to subscribers line 65 will be extended to the secretarial operator, including calls which are directed to this line during the subscriber's presence at his substation SB′. Similarly the calls incoming to all other answering-service-privileged subscribers lines will cause the answering trunk to be seized by their respective special line equipment, and all these calls will be taken up by line finder, Fig. 2, in order as above described. If the number of special line equipments accessible to the finder switch Fig. 2 is not too great, this arrangement will ordinarily not result in excessive waiting times, because most of the calls are promptly answered by the respective subscribers at their substations and, furthermore, because the periods of absence of the individual privileged subscriber from their substations will only partially overlap with each other. In any event, the dual lamp feature and the manual release facilities provided at the answering end make it possible for the operator to release the answering trunk upon the receipt of a prematurely abandoned or subscriber-answered call without delay, thereby freeing this trunk speedily for the extension thereover of other waiting calls. If the operator fails to release a given call, automatic release is effected under the control of the timer, Fig. 9, if provided.

If the answering trunk is to be equipped with two-motion switches at both ends Figs. 3 and 8, possibly in conjunction with Fig. 9, are used with Fig. 6. The identifier switch of Fig. 8 is a Strowger switch similar to that shown in Fig. 5 both in mechanical and circuit design except that two additional relays 850 and 865 are used. Answering plug 85 and jack 84 again correspond to answering plug 59 and jack 58 of Fig. 5. When start relay 630 is operated and locked responsive to the receipt of an incoming call by special line equipment, Fig. 6, whose number in the answering system, Figs. 3 and 8, again is assumed to be 32, relay 320, Fig. 3, operates in the following circuit: ground, contact 377, conductor 25, contact 635, conductor 24, contact 378, winding of relay 320, battery. Relay 320 in operating causes the two switches to be vertically advanced as described in connection with the first embodiment until a grounded level-marking conductor 23 is found by the finder. If this occurs vertical test relay 330 operates over the following circuit: ground on conductor 25, contact 634, conductor 23, vertical wiper 41 in position three, winding of relay 330, battery. The functions of relay 330 are the same as above described and include the connection of synchronizing ground to conductor 47 which causes the operation of relay 820, and upon the disconnection of this ground at 343, the operation of relay 830 at the distant end. Relays 820 and 830 correspond in their functions to relays 520 and 530, Fig. 5, of the first embodiment. Upon the operation of relay 830 the two switches are then synchronously advanced in their secondary direction until test relay 350 upon finding the calling line circuit operates in a circuit extending from ground on conductor 25 by way of contact 633, test conductor 22, finder wiper C in position 32, winding of relay 350 to battery. The functions of this test relay are also similar to that described above for the first embodiment. More particularly, when ground is connected to trunk conductor 47 at contact 35 relay 840 is operated in the following circuit: ground, contacts 355 and 362, conductor 47, contacts 836 and 845, winding of relay 840, battery. Relay 840 at 841 causes the release of rotary magnet 890 in completion of the last rotary step; at 842 opens the pulsing circuit; at 843 opens another point in the magnet operating circuit at this end; at 844 connects ground to the upper terminal of relay 850; at 845 opens its own operating circuit and at 846 locks to ground at contact 873.

Relay 850 cannot operate as long as shorting ground is connected by way of conductor 47 and contacts 836 and 855 to its lower terminal, but when ground is removed from conductor 847 by the operation of slow-to-operate relay 360 relay 850 operates in a circuit extending from ground at contact 844 through the winding of relay 850 and resistance 91 to battery. It will be noted that with relay 360 operated this winding of ground-connected relay 365 is connected to conductor 47 at contact 361. However, the winding of relay 365 is a high-resistance winding and this winding and, at the other end, the winding of relay 850 and also resistance 91 are so dimentioned that relay 365 will not operate under this condition in series with resistance 91 nor will relay 850 be prevented from operating in series with resistance 91, provided only that no lamp-flashing pulse is at this time forwarded over the EC wiper of the finder switch. On the other hand, should ring-up relay 620 be operated at the time relay 360 closes contact 361, direct ground will be maintained on conductor 47 for a slightly longer interval and relay 850 operated only when this ground is removed by the release of ring-up relay 620. However, if relay 620 subsequently reoperates in response to the next splash of ringing current received the closure of contact 621 will cause the operation of flashing relay 865 namely over the following circuit: ground on conductor 25, contact 621, EC conductor 26, EC wiper of the finder switch in position 32, contact 361, conductor 47, contacts 836 and 854, winding of relay 865, battery.

Relay 865 in operating at its contact 866 operates the buzzer 88 over an obvious circuit and in parallel thereto lights calling lamp 87, namely by way of wiper 86 of the identifier switch in its position 32. The flashing relay 865 remains under control of contact 621 of the ring-up relay and accordingly operates once in response to each splash of ringing transmitted by connector 68, whereby identifying lamp 87 is correspondingly flashed.

The secretarial operator responds to the call by inserting plug 85 into jack 84, thereby causing the ring to be tripped to the connector and the talking circuit to be switched through both in the connector and line finder, Fig. 3, substantially as above described for the first embodiment. At the end of the conversation the operator withdraws plug 85 so that release relay 370 initiates the release of the trunk and causes the transmission of the release control pulse over conductor 48 in the manner above described. Relay 870, Fig. 8, now operates in the following circuit: ground, contacts 374 and 363, conductor 48, contacts 833 and 851, winding of relay 870, battery. Relay 870 in operating at 871 locks to vertical-off-normal contact 90, at 873 causes the release of relays 820, 830, 840 and 850 and at 872 operates release magnet 800 over an obvious circuit. In response to the actuation of this magnet the mechanism of the identifier switch Fig. 8 is restored to normal and when vertical-off-normal contact 90 opens at the time the Strowger mechanism reaches its normal position, the locking circuit of relay 870 is opened so that release magnet 800 also is permitted to restore. The circuit of off-normal lamp 89 is broken upon the release of relay 850. The switches at both ends have now returned to their normal condition.

The two-motion identifier switch, Fig. 8, also is provided with special release facilities which may be used by the operator particularly in the case of abandoned or subscriber-answered calls, such calls again being indicated by the lit condition of off-normal lamp 89 and the failure of any of the calling lamps to flash. These special release facilities include release key 93 and relay 860. When the operator actuates non-locking key 93 relay 860 operates over an obvious circuit, thereby at 861 locking to ground at contact 873 and at 862 causing the operation of relay 365 over the following circuit: ground, high-resistance winding of relay 365, contact 361, conductor 47, contact 862, low-ohm resistance 92, battery. Relay 365 in operating operates release relay 370 over an obvious circuit and this relay again initiates the release of the trunk and its associated equipment as hereinbefore described. When relay 870 operates responsive to the transmission of the release control pulse over conductor 48, it opens at 873 the locking circuit among others of relay 860 so that this relay restores and in turn permits relay 365 to release. Relay 370 again is held until the switch mechanism of the finder has returned to normal.

As mentioned above, the embodiment according to Fig. 6 makes it possible to selectively provide one or more subscribers of a party line with answering service, viz. by designing or connecting ring-up relay 620 so as to respond only to a given kind of ringing current projected by the connector. Thus, if harmonic ringing is used, ring-up relay 620 may, for example, be of the well-known traffic ringer type and tuned so as to operate only in response to the ringing frequency assigned to the particular subscriber whose incoming calls are to be intercepted.

While only two embodiments of the invention have been illustrated and described it is to be understood that numerous modifications in the details of arrangement may be resorted to without departing from the true spirit and scope of the invention as defined in the appended claims.

What is claimed is:

1. In a telephone system, a central office, a plurality of substations entitled to secretarial answering service each having a key, a plurality of subscriber lines each connecting the corresponding substation with said central office, said central office comprising connecting means having a terminal appearance for each line for extending calls thereto, each of said appearances including a test terminal, an answering trunk common to said plurality of substations, finder means at one end of said trunk, secretarial answering apparatus at the other end of said trunk, each of said line equipments including conditioning means and call responsive means, said conditioning means being operated over the corresponding line under the control of said key for effectively connecting said call responsive means to said test terminal and said call rseponsive means being subsequently operated in response to the activation of said test terminal in a call incoming to said line over said connecting means for starting said finder means in search of said line equipment, whereby said call is extended to said secretarial answering apparatus by way of said trunk.

2. In a telephone system, a central office, a plurality of substations entitled to secretarial answering service each having a key, a plurality of subscriber lines each connecting the corresponding substation with said central office, said central office comprising connecting means having a terminal appearance for each line for extending calls thereto, each of said appearances including a test terminal, an answering trunk common to said plurality of substations, finder means at one end of said trunk, secretarial answering apparatus at the other end of said trunk, each of said line equipments including conditioning means and start means, said conditioning means being operated over the corresponding line under the control of said key for effectively connecting said start means to said test terminal and said start means being subsequently operated in response to the activation of said test terminal in a call incoming to said line over said connecting means for locking said start means independently of said connecting means, preventing the start means of concurrently called line equipments from operating, and starting said finder means in search of said first-mentioned line equipment, whereby said first-mentioned call is extended to said secretarial answering apparatus by way of said trunk.

3. In a telephone system, a plurality of substations entitled to secretarial answering service each of said substations having a key and having associated therewith a line equipment and a subscribers line interconnecting said substation and said line equipment, connecting means for extending calls to any of said lines, an answering trunk, finder means at one end of said trunk, secretarial answering apparatus at the other end of said trunk, each of said line equipments having conditioning means operated over the associated line under the control of said key for conditioning said line for secretarial service, and having start means thereafter operated responsive to the receipt over said connecting means of an incoming call to said line for starting said finder means in search of said first-mentioned line equipment, whereby said call is extended to said secretarial answering apparatus by way of said trunk, and means controlled by said start means for busying the lines corresponding to other conditioned line equipments to incoming calls.

4. In a telephone system, a switchboard, a plurality of substations entitled to secretarial answering service and each having a key; a plurality of subscribers lines each connecting the associated substation with said switchboard, said switchboard comprising connecting means having a terminal appearance for each of said lines for extending calls thereto, each of said lines also having associated therewith in said switchboard a regular line equipment and a special line equipment for answering service; an answering trunk, non-numerical switching means interposed between said plurality of terminal appearances and one end of said trunk, and secretarial answering apparatus at the other end of said trunk; one end of said special line equipment being connected to the associated line and its other end connected in parallel to the associated terminal appearance and the associated regular line equipment, and said special line equipment including conditioning means operated over the associated line under the control of said key for conditioning said line for answering service and means thereafter responsive to the receipt over said connecting means of an incoming call to said line for causing said non-numerical switching means to individually connect the associated terminal appearance to said answering apparatus by way of said trunk.

5. In a telephone system, a switchboard, a plurality of substations entitled to secretarial answering service and each having a key; a plurality of subscribers lines each connecting the associated substation with said switchboard, said switchboard comprising connecting means having a terminal appearance for each of said lines for extending calls thereto each of said appearances including a test terminal, each of said lines further having associated therewith in said switchboard a regular line equipment and also a special line equipment for answering service having a pair of talking conductors; an answering trunk having secretarial answering apparatus connected thereto; the talking conductors of said special line equipment being connected at one end to the associated line and at the other end connected in parallel to the associated terminal appearance and the associated regular line equipment, and said special line equipment including conditioning means and call responsive means, said conditioning means being operated over the associated line under the control of said key for connecting said call responsive means to said test terminal and said call responsive means being subsequently operated in response to the activation of said test terminal in a call incoming to said line over said connecting means for causing said trunk to be connected to said terminal appearance.

6. In a telephone system, a switchboard, a plurality of substations entitled to secretarial answering service and each having a key a plurality of subscribers lines each connecting the associated substation with said switchboard, said switchboard comprising connecting means having a terminal appearance for each of said lines for extending calls thereto each of said appearances including a test terminal, each of said lines further having associated therewith in said switchboard a regular line equipment and also a special line equipment for answering service having a pair of talking conductors; an answering trunk, non-numerical switching means interposed between said plurality of terminal appearances and one end of said trunk, and secretarial answering apparatus at the other end of said trunk; the talking conductors of said special line equipment being connected at one end to the associated line and at the other end connected in parallel to the associated terminal appearance and the associated regular line equipment, and said special line equipment including conditioning means and start means, said conditioning means being operated over the associated line under the control of said key for connecting said start means to said test terminal and said start means being subsequently operated in response to the activation of said test terminal in a call incoming to said line over said connecting means for causing said non-numerical switching means to individually connect the associated terminal appearance to said answering apparatus by way of said trunk.

7. In a telephone system, a switchboard, a plurality of substations entitled to secretarial answering service and each having a key; a plurality of subscribers lines each connecting the associated substation with said switchboard, said switchboard comprising connecting means having a terminal appearance for each of said lines for extending calls thereto each of said appearances including a test terminal, each of said lines further having associated therewith in said switchboard a regular line equipment and also a special line equipment for answering service interposed between the associated line and the associated terminal appearance and regular line equipment and including a conditioning relay, a switching relay and a call responsive relay, an answering trunk having secretarial answering apparatus connected thereto, said switching relay being normally connected to said test terminal and operated in response to the activation of said test terminal in a call incoming to said line for switching said special line equipment through to said line, said conditioning relay being operated over the associated line under the control of said key for transferring said test terminal from said switching relay to said call responsive relay, and said call responsive relay being subsequently operated in response to the activation of said test terminal in an incoming call for causing said trunk to be connected to said terminal appearance.

8. In a telephone system, a switchboard, a plurality of substations entitled to secretarial answering service and each having a key; a plurality of subscribers lines each connecting the associated substation with said switchboard, said switchboard comprising connecting means having a terminal apeparance for each of said lines for extending calls thereto each of said appearances including a test terminal, each of said lines further having associated therewith in said switchboard a regular line equipment and also a special line equipment for answering service interposed between the associated line and the associated terminal appearance and regular line equipment and including a conditioning relay, a switching relay and a call responsive relay, an answering trunk having secretarial answering apparatus connected thereto, said switching relay being normally connected to said test terminal, said conditioning relay being operated over the associated line responsive to a conditioning control of said key for transferring said test terminal from said switching relay to said call responsive relay, said call responsive relay being subsequently operated in response to the activation of said test terminal in an incoming call for locking itself independently of said conditioning relay and causing said trunk to be connected to said terminal appearance, and said conditioning relay then being released responsive to a resetting control of said key for causing the operation of said switching relay from said test terminal if still activated, whereby said line when seized at said substation subsequent to said resetting control, is connected onto said incoming call by way of said special line equipment.

9. In a telephone system, a plurality of substations entitled to secretarial answering service each of said substations having a key and having associated therewith a line equipment and a subscribers line interconnecting said substation and said line equipment, connecting means for extending calls to any of said lines, an answering trunk, a finder switch at one end of said trunk, secretarial answering apparatus including an identifier switch at the other end of said trunk, each of said line equipments having conditioning means operated over the associated line under the control of said key for conditioning said line for secretarial service and start means thereafter responsive to the receipt over said connecting means of an incoming call to said line for starting said finder switch in search of said line equipment, and an impulsing circuit extending over said trunk for advancing said identifier switch in unison with said finder switch, whereby said call is extended over said trunk to said secretarial answering apparatus and the identity of said called line registered thereat.

10. In a telephone system, a plurality of substations each having associated therewith line equipment for providing said substation with answering service and a subscribers line interconnecting said substation and said line equipment, connecting means for extending calls to any of said lines, an answering trunk, a finder switch of the two-motion type at one end of said trunk, answering apparatus including an identifier switch to the two-motion type at the other end of said trunk, each of said line equipments including start means responsive to the receipt over said connecting means of an incoming call to said line for starting said finder switch in search of said line equipment, an impulsing circuit extending over said trunk for advancing said identifier switch first in its primary and then in its secondary direction, in unison with said finder switch during said search, and means effective at the end of the primary advancement of said finder switch for transmitting a distinct synchronizing signal over said trunk thereby to insure substantially simultaneous closure of said impulsing circuit at both ends preparatory to the secondary advancement of said switches.

11. In a telephone system, a plurality of substations each having associated therewith line equipment for providing said substation with answering service and a subscribers line interconnecting said substation and said line equipment, connecting means for extending calls to any of said lines, an answering trunk, a finder switch at one end of said trunk, answering apparatus including an identifier switch and a plurality of line identifying lamps at the other end of said trunk, each of said line equipments including a ring-up relay intermittently operated in response to ringing current received over said connecting means on a call incoming to said line and a start relay responsive to the operation of said ring-up relay for locking itself in operated condition and causing said finder switch to be started in search of said line equipment, said identifier switch being positioned in unison with said finder switch for selecting the corresponding line identifying lamp, and a circuit extending over said trunk and controlled by said ring-up relay for intermittently lighting said lamp.

12. In a telephone system, the combination as claimed in claim 11 and further defined by the provision at said last-mentioned end of answering means and of manually actuable release means independent of said answering means and at said first-mentioned end of supervisory means, said answering means being effective in controlling the closure of an answering loop over said trunk, and said supervisory means being effective in response to the closure of said loop for causing said call to be switched through over said trunk and effective in response to the reopening of said loop for causing said switches to be released, and said supervisory means being effective in response to the actuation of said manual release means for causing said switches to be immediately released without prior switch through of said call.

References Cited in the file of this patent

UNITED STATES PATENTS

| | | |
|---|---|---|
| 1,743,429 | Clark | Jan. 14, 1930 |
| 1,772,713 | Friendly | Aug. 12, 1930 |
| 1,905,711 | Hinricksen | Apr. 25, 1933 |
| 1,922,879 | Burgener | Aug. 15, 1933 |
| 1,934,949 | Powell et al. | Nov. 14, 1933 |
| 1,967,408 | Kahn | July 24, 1934 |
| 2,095,712 | Peterson | Oct. 12, 1937 |
| 2,268,397 | Hersey | Dec. 30, 1941 |
| 2,274,759 | Wicks | Mar. 3, 1942 |
| 2,358,017 | Lomax | Sept. 12, 1944 |
| 2,718,552 | Brunberg | Sept. 20, 1955 |